United States Patent [19]
Knowlton

[11] Patent Number: 4,957,579
[45] Date of Patent: Sep. 18, 1990

[54] METHOD AND APPARATUS FOR APPLYING LIQUID ACID TO A SURFACE

[76] Inventor: Glenn C. Knowlton, 2262 Bronson Dr., St. Paul, Minn. 55112

[21] Appl. No.: 357,820

[22] Filed: May 26, 1989

Related U.S. Application Data

[62] Division of Ser. No. 78,038, Jul. 27, 1987, Pat. No. 4,834,803.

[51] Int. Cl.[5] ..... B32B 31/18; B65B 43/00

[52] U.S. Cl. ..... 156/248; 156/250; 156/267; 493/345; 493/346; 493/944; 493/960; 53/435; 53/452; 53/410

[58] Field of Search ..... 156/248, 249, 250, 267; 493/345, 346, 960, 944; 53/452, 453, 471, 410, 435, 431, 520, 521, 558, 559

[56] References Cited

U.S. PATENT DOCUMENTS

| | | | |
|---|---|---|---|
| 2,034,269 | 3/1936 | Price | 493/345 X |
| 2,577,249 | 12/1951 | Jenett | 53/452 X |
| 2,682,138 | 6/1954 | Sax | 53/452 |
| 2,703,083 | 3/1955 | Gross | 156/248 X |
| 2,951,304 | 9/1960 | Herte | 493/944 X |
| 2,984,921 | 5/1961 | Herzig | 493/944 X |
| 3,429,096 | 2/1969 | Griese, Jr. | 53/471 |
| 3,524,782 | 8/1970 | Buske | 156/248 |
| 3,966,532 | 6/1976 | Harasta | 156/248 X |
| 3,991,673 | 11/1976 | Coale et al. | 156/248 X |
| 4,246,058 | 1/1981 | Reed | 156/248 X |
| 4,457,798 | 7/1984 | Hoppe et al. | 156/248 |
| 4,699,679 | 10/1987 | Cartmell et al. | 156/248 X |
| 4,793,884 | 12/1988 | Horikiri | 156/248 X |

*Primary Examiner*—Horace M. Culver
*Attorney, Agent, or Firm*—Peterson, Wicks, Nemer & Kamrath

[57] ABSTRACT

Method and apparatus for applying liquid acid to a treatment surface according to the teachings of the present invention is disclosed utilizing an acid pack formed in a preferred aspect by stencil cutting a supply stock of a layered assemblage including flexible, acid impervious material, pressure sensitive adhesive, and an adhesive covering. Specifically, a first stencil cut is made extending through the assemblage and a second stencil cut is simultaneously made extending through the adhesive covering while leaving the flexible material in tact dividing the adhesive covering into a central portion and a perimeter portion. The central portion of the adhesive covering is removable exposing the adhesive on the flexible, acid impervious material to allow securement of acid absorbing material thereto while the perimeter portion of the adhesive covering is maintained in a covering relation with the perimeter edge of the sheet for providing support for the flexible, acid impervious material. A pocket for receipt of the liquid acid is created by tightly sealing the perimeter edge of the sheet of flexible, acid impervious material to the treatment surface. The acid absorbing material absorbs the liquid acid and carries and uniformly spreads the liquid acid.

4 Claims, 1 Drawing Sheet

METHOD AND APPARATUS FOR APPLYING LIQUID ACID TO A SURFACE

This is a division of co-pending application Ser. No. 078,038, filed on July 27, 1987, now U.S. Pat. No. 4,834,803.

BACKGROUND

The present invention relates generally to the application of liquid acid, particularly to the application of liquid acid to a surface, and specifically, to the application of liquid acid to automobile bodies for rust repair.

In the field of automobile body repair, one of the most difficult problems encountered is how to deal with rust pitted areas, such as around door locks, around handles, under chrome trim and vinyl tops, along the lower edge of doors, rock chips that have rusted, paint blisters, etc. The reason this type of rust is so difficult to deal with is metal replacement is not warranted, but problems arise from this rust on repainting or touching up. Specifically, if all the rust particles are not completely removed, the remaining rust particles will cause the new paint to bubble within a couple of months or so. Additionally, many times heavily pitted rust areas hide little pinholes in the metal which allow moisture to slowly seep under a new paint job, causing unsightly bubbles. This is true even when the best of materials is used. Therefore, the only foolproof answer to this problem is to be absolutely sure the rust has been completely removed from the area to be refinished. However, although clearly desired, complete rust removal is very hard to accomplish. This is why many professional body shops try to limit their repair to late model automobile repair and avoid rust repair if possible. If professional body shops do take in automobiles requiring rust repair, the price reflects the difficulty of dealing with this problem, and even then, no guarantees are given for rust repair. This results in frustrated car owners who try to deal with the problem, resulting in the birth of many backyard body men.

Prior to the present invention, several methods were utilized in rust repair having various degrees of success and shortcomings. One prior method was to utilize a coarse grit grinder to remove paint and surface rust from the affected area, to utilize a body hammer to try to loosen rust and to utilize a stiff wire wheel or brush to clear the rust out of the pitted area and refinish. Drawbacks to this method were the removal of good metal through the grinding procedure resulting in weakening of the metal. Additionally, the use of a body hammer stretches the metal, causing more time to be spent in body work using fillers to straighten a panel compounding the problem if all rust is not removed, which is usually the case with this method, as the remaining rust particles will loosen and bubble the body fillers. Further, the rust pits are so small that it is virtually impossible to clean the metal thoroughly with a wire wheel or brush. Furthermore, this method does not reveal troublesome pinholes which allow seepage under the new paint job. Thus, this method generally does not result in complete rust removal and is otherwise disadvantageous including being time consuming and dirty.

Another method utilized for rust repair is to utilize products, which when sprayed over rusted areas, turns the rust to a hard black substance that is supposed to stop the rusting action and provide a solid base for a paint job. However, long term repair has not been proven and questions as to its effectiveness arise at least for very logical reasons. Specifically, even though the rust has somehow been magically changed to another more desirable substance it is still there hiding all those troublesome pinholes that will allow moisture seepage from the back side. This causes the rust action to begin again and the return of the original problem. Additionally, rust is not the best bonding agent. There is no guarantee that this magically changed rust will adhere any better in the long term. These problems will always cause some scepticism about this method of rust repair.

Sandblasting is an effective method to deal with pitted rust areas. Sandblasting does an effective job of cleaning the tiny pits and exposing the pinholes. Sandblasting, however, does have serious drawbacks as well. Although a sandblaster has been developed especially for automobile body repair which uses graphite instead of sand and which uses a vacuum which reduces but does not eliminate problems encountered with standard sandblasters, sand filters in absolutely everywhere in the automobile as well as in the shop. This results in a dirty environment requiring extensive cleaning. However, it is virtually impossible to clean all the sand from the automobile and/or the shop, and the remaining sand tends to blow out just as the final coat of the paint is being put on, ruining the desired finish. Further, due to extreme heat and pressure exerted by this method of rust repair, sandblasting warps the body panels and is usually never used on an open panel such as a door, quarter panel, hood, trunk, fender, etc., but is generally confined to wheelwell openings, door edges, and other double thick metal locations which are rigid enough to resist warpage to a greater degree. Even so, extra body work is needed to straighten any sandblasted area. Additionally, sandblasting removes good metal resulting in weakening of the metal. Further, sandblasting equipment is typically not easily accessible to most automobile shops and automobile owners and are expensive to purchase or rent. Thus, this method is similarly disadvantageous in addition to being time consuming.

Acid dipping completely removes any and all rust from any submerged metal. Typically, muratic or hydrochloric acid or phosphoric acid is used to remove rust from metal. However, this method is not widely used in automobile body repair with the exception of very expensive restoration projects for several reasons. First, a large vat of acid is required to submerge an entire automobile and related parts. Additionally, the automobile must be completely disassembled including removal of all glass, chrome, software, rubber, wiring, brake material, bearings, etc., which is a very expensive and time consuming project. Further, the automobile and related parts must be transported to an acid dipping company which is difficult due to their bulkiness and weight.

Thus, a need exists in the field of automobile body repair for removing rust which eliminates all the problems of prior methods and products. Further, a need exists for removing rust which is inexpensive, safe, absolutely clean, easy to apply and is not time consuming and completely removes any and all rust from automobile bodies.

SUMMARY

The present invention solves these and other needs by providing a method and apparatus for applying liquid acid to a surface. Specifically, a pocket is provided for receipt of the liquid acid to be suspended and concentrated within the pocket adjacent to the treatment surface. The pocket is created by securing the perimeter edge of a sheet of flexible, acid impervious material to the treatment surface with sufficient adherence to achieve a tight seal between the sheet and the treatment surface. Flexible material for absorbing the liquid acid and for carrying and uniformly spreading the liquid acid is located within the pocket and is secured to the sheet of flexible, acid impervious material within the perimeter edge.

In a preferred form of the present invention, an object is placed between the perimeter edge and the treatment surface to form a trough after its removal for the introduction of the liquid acid, with the trough being sealable with the treatment surface to seal in the liquid acid in the pocket.

In another aspect of the present invention, apparatus for applying liquid acid to a treatment surface is formed by stencil cutting a supply stock of a layered assemblage including flexible, acid impervious material, pressure sensitive adhesive, and an adhesive covering. Specifically, a first stencil cut is made extending through the assemblage and a second stencil cut is simultaneously made extending through the adhesive covering while leaving the flexible material in tact dividing the adhesive covering into a central portion and a perimeter portion. The central portion of the adhesive covering can then be removed to expose the adhesive on the flexible, acid impervious material to allow securement of acid absorbing material thereto while the perimeter portion of the adhesive covering is maintained in a covering relation for providing support for the flexible, acid impervious material.

It is thus an object of the present invention to provide a novel manner of applying liquid acid to a surface.

It is further an object of the present invention to provide such a novel liquid acid application which concentrates the liquid acid within a pocket.

It is further an object of the present invention to provide such a novel liquid acid application which seals in the liquid acid and any fumes generated.

It is further an object of the present invention to provide such a novel liquid acid application for use in rust removal.

It is further an object of the present invention to provide such a novel liquid acid application for use in the field of automobile body repair.

It is further an object of the present invention to provide such a novel liquid acid application which is inexpensive.

It is further an object of the present invention to provide such a novel liquid acid application which is safe.

It is further an object of the present invention to provide such a novel liquid acid application which is clean.

It is further an object of the present invention to provide such a novel liquid acid application which maximizes labor efficiencies.

It is further an object of the present invention to provide such a novel liquid acid application which is not time consuming.

It is further an object of the present invention to provide such a novel liquid acid application which completely removes rust.

It is further an object of the present invention to provide such a novel liquid acid application which overcomes the drawbacks and shortcomings of prior methods of rust removal in the field of automobile body repair.

It is further an object of the present invention to provide such a novel liquid acid application which does not require expensive equipment.

It is further an object of the present invention to provide such a novel liquid acid application which is disposable.

It is further an object of the present invention to provide such a novel liquid acid application which is usable on any contour.

It is further an object of the present invention to provide such a novel liquid acid application which is usable in any orientation.

It is further an object of the present invention to provide such a novel liquid acid application which is modular.

It is further an object of the present invention to provide such a novel liquid acid application for use in etching.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
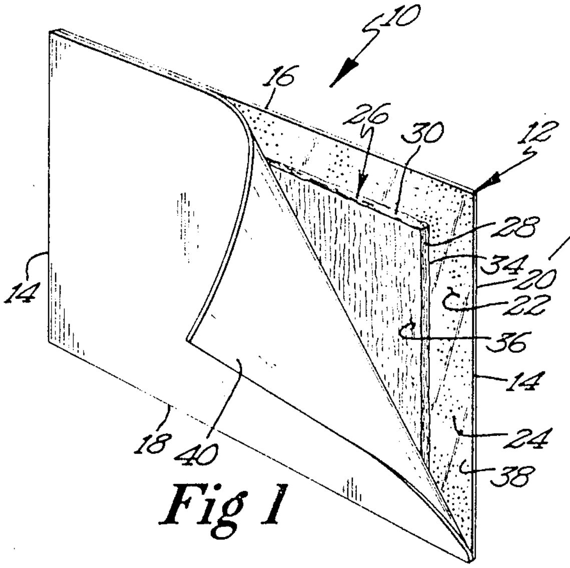
FIG. 1 shows a perspective view of an apparatus for applying liquid acid to a surface according to the preferred teachings of the present invention.
Figure 2:
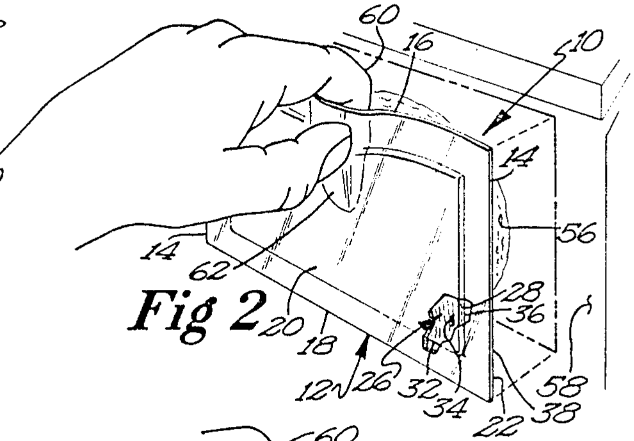
FIGS. 2 and 3 show perspective views of steps of the method of applying liquid acid to a surface utilizing the apparatus of FIG. 1 according to the teachings of the present inention.
Figure 3:
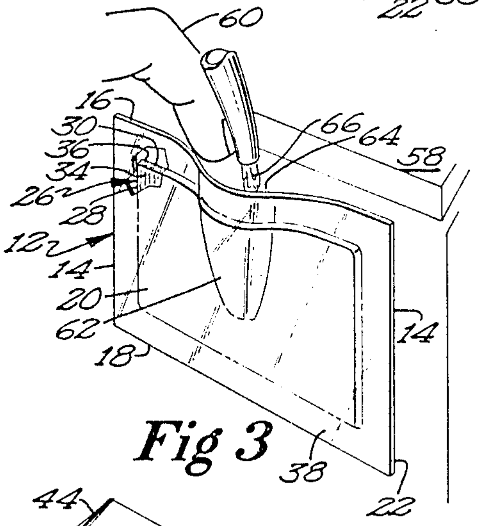

All figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inner", "outer", and similar terms are used herein, it should be understood that these terms have reference only to the structure shown in the drawings as it would appear to a person viewing the drawings and are utilized only to facilitate describing the invention.

DESCRIPTION

A method and apparatus for applying liquid acid to a surface according to the teachings of the present invention is shown in the drawings in the form of an acid pack for use in rust removal such as in an automotive market and is generally designated 10. According to the teachings of the present invention, acid pack 10 includes a sheet 12 of acid impervious, flexible material and in the preferred embodiment is transparent material, such as polyester films or vinyl, and in the most preferred form may be formed of decal-type material. Sheet 12 generally includes side edges 14, a top edge 16, and a bottom edge 18 defining its perimeter edge, an outer surface 20, and an inner surface 22.

Acid pack 10 further includes, according to the preferred teachings of the present invention, a pressure sensitive adhesive 24 covering inner surface 22 of sheet 12, with adhesive 24 being generally impervious to breaking down by the liquid acid to be used and having sufficient adherence to the treatment surface to which the liquid acid is desired to be applied, and in the most preferred form is adhesive such as used on permanent decal material for automotive purposes.

Acid pack 10 further includes a pad 26 of flexible, highly absorbent material for absorbing the liquid acid and for carrying and uniformly spreading the liquid acid and in the most preferred form is formed of a paper based material. Pad 26 generally includes side edges 28, a top edge 30, a bottom edge 32, a first surface 34, and a second, opposite surface 36. Surface 34 of pad 26 is adhered to the inner surface 22 of sheet 12 by adhesive 24, with pad 26 having a size smaller than sheet 12 to define a perimeter edge 38 circumferentially around pad 26 and between edges 28, 30, and 32 of pad 26 and edges 14, 16, and 18 of sheet 12, respectively.

In the most preferred form of the present invention, a readily removable adhesive covering sheet 40 is further provided secured to adhesive 24 located in perimeter edge 38 and covering second surface 36 of pad 26. In the most preferred form, sheet 40 may include suitable advertising, use, and identification information of acid pack 10 for reference by the user of acid pack 10 according to the teachings of the present invention.

In an alternate form of the present invention, acid pack 10 according to the teachings of the present invention is assembled in the field by the user. Specifically, a supply stock 42 which is a multiple of the size of acid packs 10 is provided including a layered assemblage including a layer of flexible material 44, pressure sensitive adhesive 24 located on the inner surface of flexible material 44, and an adhesive covering 46. Sheet 12, adhesive 24, and covering sheet 40 are then simultaneously stencil cut from supply stock 42 by a first cut 48 cutting around edges 14, 16, and 18 through all the layers. Simultaneously, a second, concentric stencil cut 50 is made having a size equal to pad 26 through covering sheet 40 but not extending though and leaving sheet 12 in tact thus dividing covering sheet 40 into a perimeter portion 52 corresponding to perimeter edge 38 and a concentric, central portion 54. Acid pack 10 is then marketed with pad 26 separate from sheet 12, adhesive 24, and covering sheet 40. In the field, the user removes central portion 54 of covering sheet 40 exposing adhesive 24 on sheet 12 thereunder. Pad 26 may then be secured to adhesive 24 exposed inside perimeter portion 52. It can then be appreciated that perimeter portion 52 of covering sheet 40 provides support for sheet 12 to prevent it from rolling, folding, or otherwise disforming causing adhesive 24 to stick to outer surface 20 of sheet 12. With pad 26 secured, acid pack 10 may be utilized in an analagous manner as if covering sheet 40 also covered pad 26. It can then be appreciated that acid pack 10 according to the teachings of the present invention can be more inexpensively manufactured and marketed when assembly is performed by the user in the field.

Figure 4:
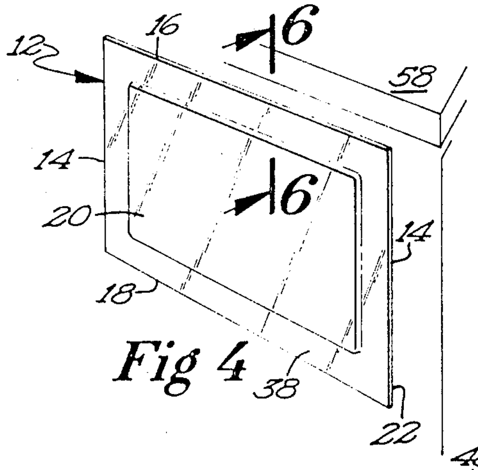
FIG. 4 shows a perspective view of the apparatus for applying liquid acid of FIG. 1 sealed to the treatment surface.
Figure 5:
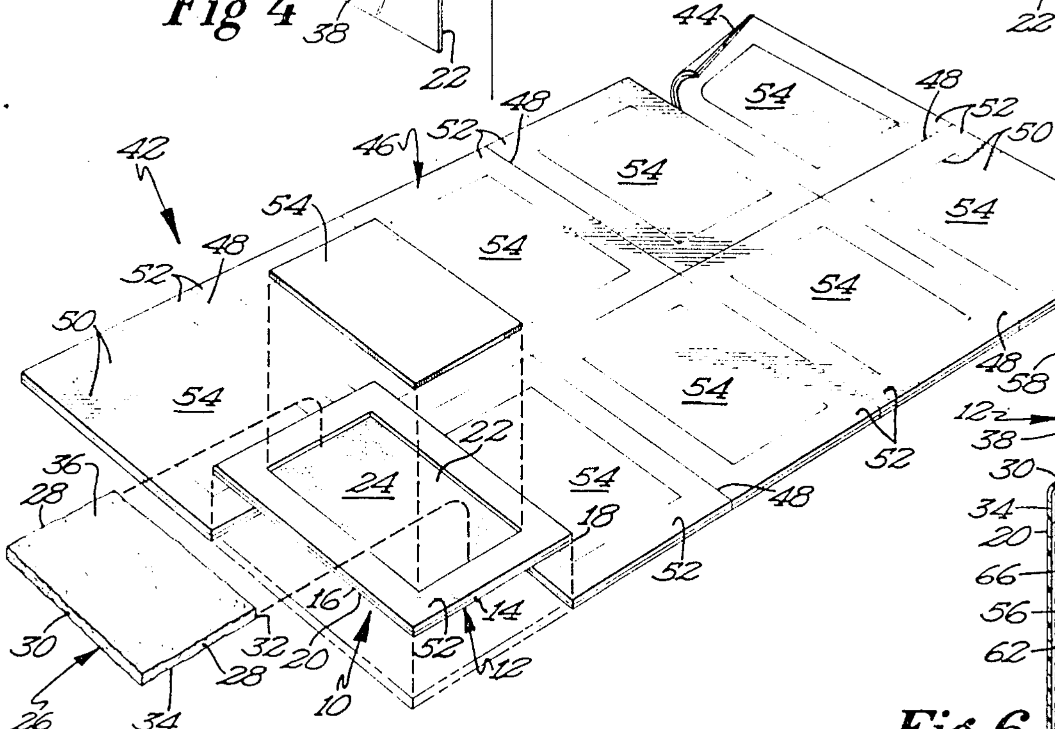
FIG. 5 shows a perspective view illustrating a perferred method of manufacture of the apparatus for applying liquid acid to a surface of FIG. 1 according to the teachings of the present invention.
Figure 6:
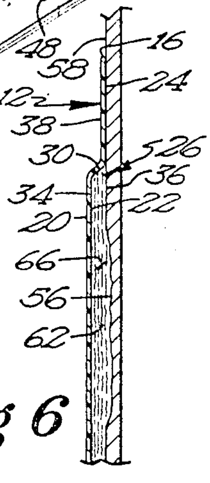
FIG. 6 shows a partial, cross-sectional view of the apparatus for applying liquid acid to a surface of FIG. 1 according to section line 6—6 of FIG. 4.

Now that the basic construction of acid pack 10 according to the teachings of the present invention has been disclosed, the method of use and subtle features of acid pack 10 according to the teachings of the present invention can be set forth and appreciated. In the most preferred form, acid pack 10 is utilized to remove rust 56 from metal treatment surfaces 58 such as automobile bodies. First, treatment surface 58 should be prepared such as by exposing the rusted area using coarse grit sandpaper and insuring that treatment surface 58 is clean and dry. Adhesive covering sheet 40 may then be removed from acid pack 10 exposing adhesive 24 in perimeter edge 38 and exposing second surface 36 of pad 26. It can be appreciated that pad 26 provides support for sheet !2 to prevent it from rolling, folding, or otherwise disforming causing adhesive 24 to stick to outer surface 20 of sheet 12. Acid pack 10 may then be positioned such that surface 36 of pad 26 is centered over the rusted area. An object 60 having an area substantially smaller than perimeter edge 30 such as the user's finger is inserted to extend between top edge 16 of sheet 12 and top edge 30 of pad 26 to cover adhesive 24 in perimeter edge 30 and then acid pack 10 may be placed against treatment surface 58 and outer surface 20 is pressed along and all the way around perimeter edge 38 to achieve a tight seal between sheet 12 and treatment surface 58 and forming a pocket 62 having a cross-sectional area defined generally by second surface 36 of pad 26 and a depth defined generally by treatment surface 58 and inner surface 22 of sheet 12 which is generally the thickness of pad 26 between surfaces 34 and 36. At that time, object 60 may be removed from between edges 16 and 30 such that a trough 64 is formed by the area of perimeter edge 38 not adhered to treatment surface 58. Using a plastic pump bottle or the like, liquid acid 66 such as muratic or hydrochloric acid, phosphoric acid, or other liquid acid can be introduced into pocket 62 through trough 64 until pad 26 is over saturated. The degree of saturation can be determined by feeling outer surface 20 of sheet 12 and/or looking at liquid acid 66 located in pocket 64 through transparent sheet 12. After pocket 64 is filled with liquid acid 66, perimeter edge 38 defining trough 64 can be sealed by pushing against outer surface 20 of sheet 12 such that adhesive 24 is tightly sealed entirely around perimeter edge 38 as best seen in FIG. 4. It can then be appreciated that liquid acid 66 is suspended within pocket 62 and the rust-dissolving action is sealed in and concentrated within pocket 62 and no harmful fumes can escape. Sufficient time should be allowed for liquid acid 66 to have effective results which may range anywhere from 10 minutes to eight hours depending upon the severity of rust 56 and upon the particular liquid acid 66 used such that rust 56 has been dissolved from treatment surface 58 and absorbed in pad 26. The rust removal process can be hastened by applying low heat to acid pack 10 such as supplied by an electrical heat gun or the equivalent. A corner of perimeter edge 38 then may be lifted off to allow peeling off acid pack 10 from treatment surface 58 for dropping in a neutralizing agent such as water to neutralize an remaining acid 66 in acid pack 10. Treatment surface 58 should be rinsed with neutralizing agents such as water to remove any residual acid 66 from treatment surface 58. Treatment surface 58 should then be bright and totally rust free such that refinishing can proceed after drying.

It can then be appreciated that pad 26 performs multiple functions and is particularly advantageous according to the teachings of the present invention. First, pad 26 prevents adhesive 24 within perimeter edge 38 from adhering to treatment surface 58 allowing formation of pocket 62 according to the teachings of the present invention. Specifically, pad 26 allows the entire inner surface 22 to be covered with adhesive 24, in the preferred form, of the same type and consistency to allow easier and less expensive fabrication. Additionally, pad 26 provides a carrier for liquid acid 66 to uniformly spread liquid acid 66 on treatment surface 58 within pocket 62. Therefor, uniform penetration of liquid acid 66 can be assured for treatment surface 58 within pocket 62 according to the teachings of the present invention. Further, pad 26 tends to cling to treatment surface 58 when wet with liquid acid 66 providing assured contact with treatment surface 58 and rust 56 thereon in the event that small amounts of liquid acid 66 are utilized. Additionally, pad 26 facilitates a cleaner removal of acid pack 10, liquid acid 66, and removed rust 56 from treatment surface 58 according to the teachings of the present invention due to its absorbent characteristics.

It can then be appreciated that acid pack 10 according to the teachings of the present invention obtains the complete removal of rust 56 from metal treatment surfaces 58 in a manner as obtained in acid dipping while overcoming the drawbacks and shortcomings of acid dipping and avoiding the drawbacks and shortcomings of other prior rust removal methods. Therefore, acid pack 10 is advantageous in obtaining the desired result of complete rust removal in the field of automobile body repair exposing pinholes and cleaning the rust pits without removing or stretching the metal.

It can further be appreciated that acid pack 10 according to the teachings of the present invention is easy to apply, fill with acid, and remove and requires minimal time. Rust removal according to the teachings of the present invention is clean, neat and tidy and does not produce dust or dirt which can contaminate the automobile or the work environment and which requires additional time and expense to clean. Further, after acid pack 10 is filled with liquid acid 66, other work, even sanding, can be performed on other areas of the same automobile or elsewhere without interference from and/or interruption of the rust removal of acid pack 10. Therefore, acid pack 10 according to the teachings of the present invention maximizes efficiencies in labor and time.

Further, acid pack 10 according to the teachings of the present invention is disposable after use and does not require expensive equipment for its application and removal. Therefore, no extra time is needed for cleaning and maintenance of such equipment and overhead costs are minimized utilizing the rust removal method of the present invention.

Due to the flexible nature of sheet 12 and pad 26, acid pack 10 according to the teachings of the present invention can be used on any automobile body contour such as around wheelwell openings and door edges. Further, acid pack 10 according to the teachings of the present invention can be positioned in any orientation such as horizontal, vertical, or anywhere between, such as above or below treatment surface 58, or in any combination thereof.

Furthermore, acid packs 10 are of a modular construction such that a large area of rust 56 can be removed by creating a larger acid pack 10 from a number of standard size acid packs 10 according to the teachings of the present invention. Therefore, it is not necessary to manufacture and/or store a large number of different sizes of acid packs 10 according to the teachings of the present invention.

It can then be appreciated that acid pack 10 is generally foolproof in the complete removal of rust 56 in the field of automobile body repair and can be manufactured and utilized in a relatively inexpensive manner.

Now that the basic teachings of the present invention have been explained, many extensions and variations will be obvious to one having ordinary skill in the art. For example, although acid pack 10 is shown in the preferred form in use for rust removal in the field of automobile body repair, other uses and applications of acid pack 10 may be apparent to persons skilled in the art after the teachings of the present invention are known. One such possible field is etching. Etching often utilized thick acid paste or gel. Such pastes or gel are disadvantageous over liquid acid 66 for several reasons. First, a liquid seeks its own level of penetration whereas a paste or gel is limited to its level of application. Therefore, uniform penetration cannot be guaranteed for pastes or gels as in liquid acids 66. Acid pastes or gels are more time consuming and do not as thoroughly clean as full-strength, liquid acid 66. Acid pack 10 according to the teachings of the present invention then allows the safe use of liquid acid 66 in an etching environment which overcomes the problems of acid pastes or gels. It can then be appreciated that a stencil or other pattern can be utilized in conjunction with pad 26 to effect the desired etching design.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Method of fabricating a pack for applying liquid acid to a treatment surface comprising the steps of:

(a) providing a supply stock of a layered assemblage including a layer of flexible material having an inner surface, pressure sensitive adhesive located on the inner surface of the flexible material, and an adhesive covering, with the flexible material being impervious to breaking down by the liquid acid, with the pressure sensitive adhesive being impervious to breaking down by the liquid acid and having sufficient adherence to the flexible material and the treatment surface to achieve a tight seal between the flexible material and the treatment surface creating a pocket for receipt of the liquid acid to be suspended and concentrated within the pocket adjacent to the treatment surface;

(b) stencil cutting a first cut through the layer of flexible material, the pressure sensitive adhesive, and the adhesive covering layer, with the first cut having a perimeter defining an area;

(c) stencil cutting a second cut simultaneously with the first cut through the adhesive covering layer while maintaining the layer of flexible material in tact to divide the adhesive covering layer into a central portion defined by the second cut having a perimeter defining an area smaller than the perimeter and the area of the first cut and a perimeter portion defined between the first and second cuts, with the second cut being concentric and not intersecting with the first cut; and (d) providing material for absorbing liquid acid and providing for carrying and uniformly spreading the liquid acid, with the absorbing material being flexible, with the absorbing material having a perimeter defining an area complementary to and substantially the same as the perimeter and area of the second cut allowing removal of the central portion of the adhesive covering from the first surface of the sheet to allow securement of the absorbing material while the perimeter portion of the adhesive covering is maintained in a covering relation for providing support for the flexible material.

2. The method of claim 1 wherein the step of providing a supply stock further comprises the step of providing a supply stock including a layer of flexible, transparent material allowing visual observation of the receipt of the liquid acid into the pocket created with the treatment surface.

3. The method of claim 2 wherein the step of providing a supply stock further comprises the step of providing a supply stock including a layer of flexible, transparent material formed of polyester film.

4. The method of claim 1 wherein the step of providing absorbing material comprises the step of providing a pad formed of a paper based material.

* * * * *